Figure 9A:
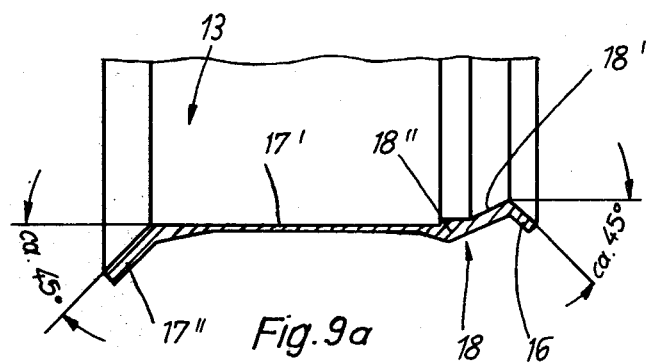

United States Patent [19]
Bosch

[11] 4,143,533
[45] Mar. 13, 1979

[54] METHOD OF MANUFACTURING SOLID WHEEL RIMS

[75] Inventor: Walter Bosch, Ostfildern, Fed. Rep. of Germany

[73] Assignee: Bohner & Kohle GmbH & Co., Esslingen, Fed. Rep. of Germany

[21] Appl. No.: 802,453

[22] Filed: Jun. 1, 1977

[30] Foreign Application Priority Data

Jun. 3, 1976 [DE] Fed. Rep. of Germany ....... 2624872

[51] Int. Cl.² .......................................... B21D 53/30
[52] U.S. Cl. ..................................... 72/68; 29/159.1; 113/116 D
[58] Field of Search .................... 72/68, 367; 29/159.1, 29/159.01; 113/116 D, 116 E; 301/10 R, 96

[56] References Cited

U.S. PATENT DOCUMENTS

| 3,846,886 | 11/1974 | Schroder et al. | 29/159.1 |
| 4,050,135 | 9/1977 | Luedi | 29/159.1 |

FOREIGN PATENT DOCUMENTS

1348893  3/1974  United Kingdom ..................... 29/159.1

*Primary Examiner*—Lowell A. Larson
*Attorney, Agent, or Firm*—Watson, Cole, Grindle & Watson

[57] ABSTRACT

A method of manufacturing a solid wheel rim having a wheel rim flange at one end of a wheel rim base and a spring-ring groove at an opposite end of the base, from a rolled and longitudinally welded sheet-metal ring of a predetermined inner diameter having a reduced wall thickness over at least a part of its length, includes the expansion of a portion of the ring to produce an annular groove zone having an inner diameter equal to the predetermined inner diameter, an enlarged zone having an inner diameter greater than such predetermined diameter, and a tapered zone located between the annular groove and enlarged zones, the wall thickness of the ring being reduced during a pressing operation, and the spring-ring groove as well as the wheel rim flange being formed during a rolling operation.

9 Claims, 11 Drawing Figures

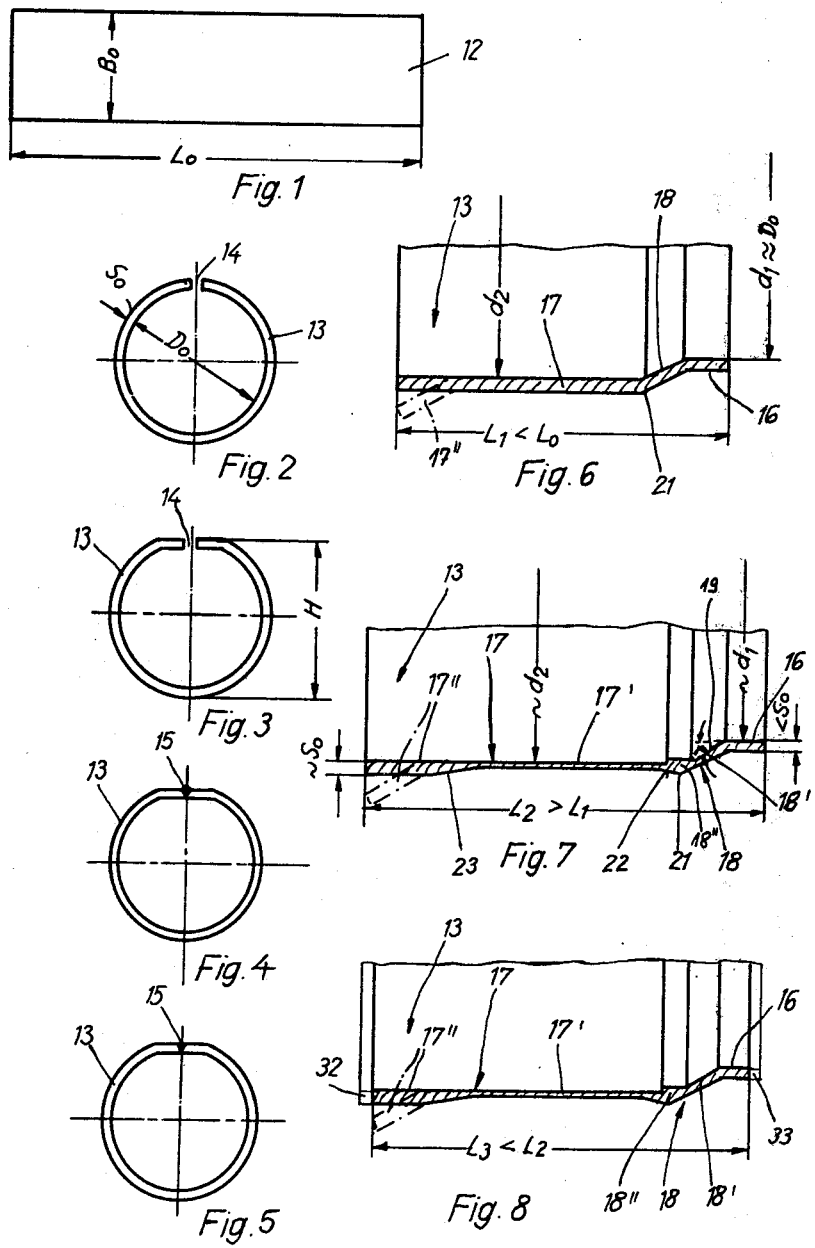

METHOD OF MANUFACTURING SOLID WHEEL RIMS

The invention relates to a method of manufacturing solid wheel rims, for example for trucks or lorries, with a wheel flange at one side of the wheel rim base and a spring ring groove at the other side, from a rolled (rounded) and longitudinally welded sheet metal ring which is shaped to the respective section shape and the wall thickness of which is reduced over at least part of its length.

In a known method of this kind (German Federal Republic Offenlegungsschrift No. 2 343 247) the spring ring groove is first of all impressed at one end of the sheet metal ring, the sheet metal ring is then shaped in determined zones from the spring ring groove towards the flange end and then stretched to its desired wall thickness and thereafter the other end is opened out to form the flange. The stretching takes place therewith through two rolling surpluses, the wheel rim base being extended in the second surplus. This known method is relatively complicated on the one hand having regard to its separate operations or procedures, as the extension of the wheel-rim base and the formation of a recess for the spring ring have to take place in separate operations, and on the other hand is relatively expensive having regard to the tools employed. Also, there is not attained at least in the zone of the spring ring groove the optimum varying wall thickness which is in conformity with the incident loads, as the spring ring groove is formed before the extension is effected. Thus, too much unnecessary material is always accumulated. Moreover after the known method is carried out the outer edging must subsequently be calibrated and the radii between the wheel rim base and on the one hand the annular groove, and on the other hand the flange, have to be smoothed.

An object of the present invention is to provide a method of the aforementioned type in which there is obtained over the whole profile of the wheel rim a varying wall thickness precisely conforming in all points and zones to the required cross-section, and which can be conducted simply and with cheaper tools.

In carrying out this object provision is made according to the invention for the rolled (rounded) and longitudinally-welded sheet-metal ring to be expanded partially or to different diameters during the rounding by variable expanding, for the enlarged zone or zones thereby formed together with an annular groove end and an inclined zone located therebetween to be then brought to different wall thicknesses by hydraulic pressure or the application of pressure, for the annular groove outer end to be pressed through about 90° and for the sheet-metal ring then to be bent outwardly flat and acute-angled at its flange end and to be shaped to a rounded flange.

In this way there is produced a relatively simple method of manufacturing solid wheel rims, in which, by hydraulically pressed the enlarged sheet metal ring at each zone of the later to be formed flange, of the wheel-rim base and of the annular groove, precisely these wall thicknesses and the transition between two different wall thicknesses can be achieved which conforms to the later loading in the working condition. This effects a saving in material and makes possible an increase in strength and rigidity of the wheel-rim surface in specific zones. It is possible with this process to stretch those zones at which little material is required, and to put or displace this material into those zones at which much material is required. This can be reproduced with a very high degree of accuracy. The simplicity of this procedural step is a result of the possibility of pressing in one working operation also the conical transition from the wheel-rim base to the flange together with the reduction in wall thickness. A further advantage consists in that the likewise necessary rounding of the sheet-metal ring after its longitudinal welding is used at the same time for the purpose of expanding the ring in such a way that the later wheel-rim base and the zone of the later flange receives a greater diameter relative to the annular groove, there being formed between the cylindrical form of the wheel-rim base and that of the annular groove a conical zone which later forms the transition from the annular groove to the wheel-rim base. After these two essential procedural steps which make possible a wall thickness adaptation to optimum requirements and compensation for tolerances in the starting material by the axial displacement of the material and hence simple trimming operations and a constant contour yield in the critical zones, there takes place the pressing and rolling operations which with simple tools and simpler types of machine achieve an economic improvement in the hydraulic pressure profiling. A further advantage consists in that, in the method according to the invention, subsequent smoothing in the rounded zones between the wheel-rim base and both the annular groove and the flange is not necessary, since the smoothing effect is attained on pressing of the annular groove and the flange.

In an embodiment of the present invention the inclined wall zone extending between the annular groove and the wheel-rim base is pressed to a cone the inner surface of which subtends an angle of 28° with the axis of rotation of the ring, which is essential for the centering on mounting the wheel-rim on the wheel spider.

In a further embodiment of the present invention the wall-thickness reduction takes place in a press, while the preforming and final forming of the annular groove end and the flange end take place in rolling machines, whereby the annular groove end and the flange end can be worked simultaneously on a rolling machine in common or alternatively on two such machines in two consecutively-occurring working operations. The advantage is to be seen in the fact that operating sequences by means of rolling are cheaper than those by means of pressing.

Further details and refinements of the invention can be gathered from the following description, in which a method of manufacturing solid wheel rims from a sheet-metal strip is more particularly described and explained according to two embodiments with reference to the diagrammatic FIGS. 1 to 10, FIGS. 1 to 5 being elevational views and FIGS. 6 to 10, being longitudinal sectional views of a wheel rim at different stages of manufacture.

In the method according to the invention of manufacturing a solid wheel rim 11, preferably for trucks or lorries, from a sheet-metal strip 12, the latter according to FIGS. 1 to 5 is first cut to a specific length Lo and width Bo from sheet material having a thickness So, shaped by rolls into a cylindrical ring with a specific inner diameter Do, and provided at a height H with a flattening in the area 14 of the abutment; the abutment area 14 of the rolled ring 13 is then longitudinally welded and the line 15 of weld subsequently smoothed. This now closed ring is then again rounded.

During the rounding the sheet-metal ring 13 is reamed up, as shown in FIG. 6, in such a way that the zone 16 of the later annular groove retains its inner diameter d, substantially equal to inner diameter Do of the sheet-metal ring 13, whereas the remaining zone 17, which later forms the base of the wheel rim, is reamed up to a larger inner diameter $d_2$, a conically-inclined zone 18 being formed between these two co-axial zones 16 and 17. The conical zone 17" for the wheel-rim flange follows the zone 17. The expanded sheet-metal ring 13 thereby still has over its full axial length the same wall thickness So to that of the original sheet 12. The diameters of the regions 16, 17 and 20 may besides, if necessary, be exactly calibrated.

The variation in wall thickness of the sheet-metal ring 13 is now formed as shown in FIG. 7 on a first press precisely to the operational and strength requirements. This wall thickness, varying differently in the axial direction, is created in one working operation starting from the zone 16 at the annular groove end. Whereas the zone 16 is made only slightly thinner and retains a constant thickness over its length, a tapered shape is impressed at the conical zone 18, in such a way that the course from the inner side 19 relative to the outer side is initially conical and is then concentric in the zone of the external bend 21 between the zones 18' and 18", so that in this zone 18" there is a considerable accumulation of material. This also yields a reduction in the material stress between the zone sections 18' and 18" of the conical zone 18; associated therewith is a stiffening of the surface. The above-described surface and wall thickness development is not an absolute necessity. Departures from this can be made according to the structural conditions at any given time, e.g., when deviations from the stress are necessary. The inner surface 19 of the inclined zone 18', pressed into a conical shape in thickness, forms an angle $\gamma$ of 28° with the axis of rotation of the wheel rim. The zone section 18" passes internally over into the zone 17' and externally by way of a conical surface 22 into the zone 17'. The zone section 17', which later forms the base of the wheel rim, receives a wall thickness substantially reduced relative to that of the original wall thickness and passes by way of a relatively shallow conical surface 23 into the zone section 17" which has approximately the original wall thickness So and which later forms the wheel flange. The conical surface 23 is moreover arranged in such a way that it ends in the zone of the later transition to the flange. The zone section 17" may if necessary also be of varying wall thickness. The reduction in wall thickness in the entire zone 17 is brought about by means of hydraulic pressures from the annular groove side to the flange side, whereby a precisely determinable wall thickness development is possible and whereby the sheet-metal ring 13 is lengthened to a greater length $L_2$.

The sheet-metal ring 13 with the length $L_2$ now provided with a wholly determined wall thickness may now, in so far as necessary, be trimmed at its edges 32, 33 so that it has the total axial length $L_3$ (FIG. 8).

According to FIG. 9a, in the case of one embodiment, the annular groove end, hence the zone 16, and the wheel-rim flange end, hence the zone 17", are then simultaneously preformed through rolling, preferably with an angle of slope of about 45°. This preforming takes place in a rolling machine. Also in a rolling machine the two zones 16 and 17" and then converted into their final shape to form the annular groove 26 and the flange 27, the wheel-rim receiving its final length $L_4$ (FIG. 9b), it will be understood that the two working operations in accordance with FIGS. 9a and 9b can be carried out on the same rolling machine or on different rolling machines in consecutive working operations. The wheel-rim base is formed at the same time between the wheel-rim flange 27 and the annular groove 26.

Figure 9B:
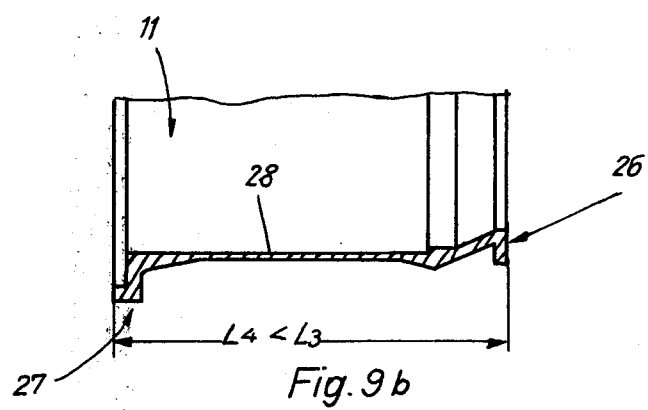

In a modification of the invention the working operations according to FIGS. 9a and 9b are combined into one working operation, that is starting from FIG. 6 the annular groove 26 and the wheel-rim flange 27 are simultaneously finally shaped. The wheel-rim flange end is already preformed in the working operation according to FIG. 6 and trimmed in that according to FIG. 8, as represented there in dash-dotted lines. On the other hand the annular groove end 16 is finally shaped directly without the intermediate step according to FIG. 9a.

Figure 10:
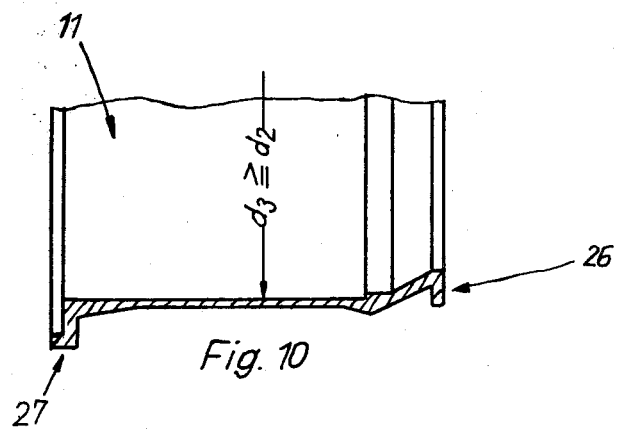

According to FIG. 10 the diameter of the wheel-rim base 28 may besides then be calibrated to its diameter $d_3$, if this should be necessary.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A method of manufacturing a solid wheel rim, for example for trucks or lorries, having a wheel-rim flange at one end of a wheel-rim base and a spring-ring groove at an opposite end of the base, from a rolled and longitudinally welded sheet-metal ring of a predetermined inner diameter shaped to a predetermined section shape and having a reduced wall thickness over at least part of its length, comprising the steps of radially expanding a portion of said ring during a rounding operation to produce an annular groove zone having an inner diameter substantially equal to said predetermined inner diameter, an enlarged zone having an inner diameter greater than said predetermined inner diameter, and a tapered zone located between said annular groove and enlarged zones, reducing the wall thickness of said ring during a pressing operation by subjecting each of said zones to a predetermined pressure, shaping said ring at said annular groove zone by means of a rolling operation to form said spring-ring groove, and shaping said ring at said one end by means of a rolling operation to form said wheel-rim flange.

2. The method according to claim 1, wherein said ring is pressed to form a tapered wall thickness at said tapered zone for increasing said wall thickness at a bend between said enlarged and said tapered zones, thereby resulting in an increase in strength and rigidity at said bend.

3. The method according to claim 1, wherein said ring is pressed into conical shape at said tapered zone, an inner surface of which subtends an angle of about 28° with a central axis of rotation of said ring.

4. The method according to claim 1, wherein said ring is hydraulically pressed at said enlarged zone to form shallow conical surfaces with said wheel-rim flange and with said tapered zone.

5. The method according to claim 1, wherein said one end and said opposite end are preformed by rolling said ends into conical shape having about a 45° slope.

6. The method according to claim 1, wherein said reducing and said shaping steps are carried out in a single working operation.

7. The method according to claim 1, wherein said pressing operation and said rolling operations are carried out in a single working operation.

8. The method according to claim 1, including the further step of calibrating said ring at said enlarged zone so as to effect another predetermined inner diameter.

9. The method according to claim 1, wherein said reducing step is carried out in a press, and said shaping steps are carried out in a rolling machine.

* * * * *